March 31, 1931. R. E. CARTZDAFNER 1,798,304
DUMP CAR
Filed July 27, 1927

INVENTOR
Roy E. Cartzdafner,
BY
Warren S. Orton
ATTORNEY

Patented Mar. 31, 1931

1,798,304

UNITED STATES PATENT OFFICE

ROY E. CARTZDAFNER, OF PASSAIC, NEW JERSEY

DUMP CAR

Application filed July 27, 1927. Serial No. 208,892.

The invention relates in general to a dump car of the type in which a car body is mounted on an underframe for tilting movement towards opposite lateral sides and about longitudinally extending axes on opposite sides of the longitudinal medial plane of the car, and in which the dumping movement is attained by the action of one or more dumping cylinders on each side of the car and the invention specifically relates to the connection between the piston of these cylinders and the portion of the car body with which they engage.

The primary object of the invention is to provide a simplified form of connection between a dumping cylinder piston and the dumping car body organized to feature compactness in structure, to effect the distribution of strain on the car body when lifted by the piston so that the strains will be received through structural parts designed for this purpose and which, at the same time, will provide a rugged, outbearing support on the underframe for receiving the load on the depressed side of the car body as the car body is turned about the same in effecting its dumping movement.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing.

Figure 1:
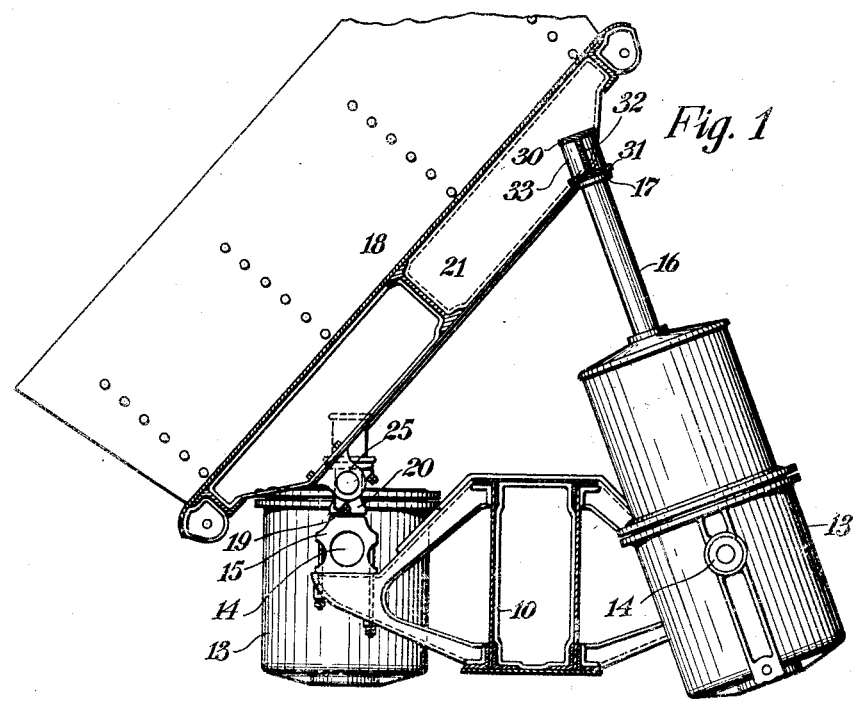
Fig. 1 is a transverse, sectional view through portions of a dump car with the usual side doors omitted and constituting a preferred embodiment of the invention and showing the car body in a tilted position dumped towards one side.
Figure 3:
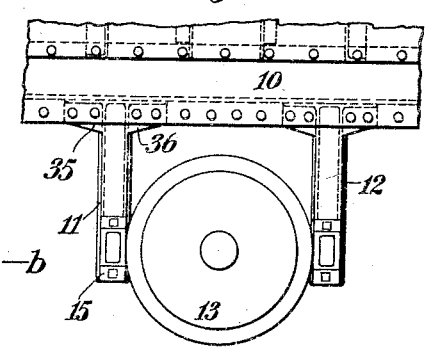
Fig. 3 is a fragmentary plane view looking down on the dumping cylinder and part of the under frame structure carrying the same and shown in side elevation in Fig. 1.

In the drawing and referring particularly to Fig. 1, there is shown a conventional form of underframe 10 provided on each side with a pair of laterally extending outbearing supports 11 and 12 particularly shown in Fig. 3 for carrying the dumping cylinder 13. The dumping cylinder is provided on opposite sides with outwardly extending trunnions 14 rotatably mounted in cylinder journal bearings 15 carried by the supports 11 and 12 on flat seats provided therefor adjacent their outer ends. The cylinders are of the telescopic type particularly shown at the right of Fig. 1 and include a piston plunger 16 terminating in a head 17 designed to engage or to be permanently fixed to the dumping car body 18 to effect a dumping movement of the same following conventional practices in this respect. The top of the bearing 15 is flat and forms a relatively wide area yoke seat 19 for receiving the ends of a yoke 20 hereinafter more fully described.

The car body 18 includes a car body underframe 21 formed in part and on opposite sides of each cylinder by two longitudinally spaced apart cross bearers 22 and 23. Depending from each of the cross bearers and secured thereto respectively are yoke journalled bearings 24 and 25.

Figure 2:
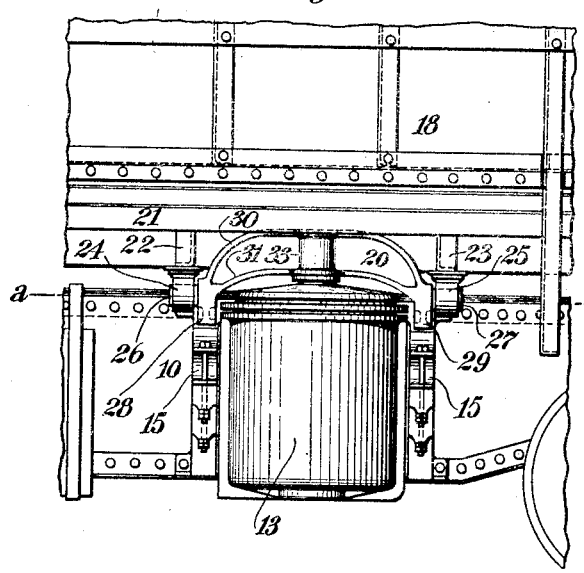
Fig. 2 is a view in front elevation of a fragmentary portion of the device shown in Fig. 1 with the car body in its normal righted position.

The yoke 20 is a relatively heavy casting of arched construction as particularly shown in Fig. 2 with trunnions 26 and 27 which are mounted for rotary movement about a horizontal axis $a$—$b$ respectively in the bearings 24 and 25. Opposite ends of the yoke are provided with depending feet 28 and 29 which provide broad bearing engagements on top of the yoke seats 19 when the car body is tipped as indicated in Fig. 1. The yoke is provided with top and bottom flanges 30 and 31 and with a connecting plate web 32 to form in effect an I-beam structure, the mid portion of which is designed to be engaged by the piston plunger 16. Preferably, the central portion of the yoke is provided with a cylindrical socket 33 into which projects a cylindrical extension constituting the extreme upper end of the piston plunger. In this way the plunger is mounted to have a permissible rotation in the yoke and about its own axis should such movement be necessary due to any inaccuracies in fit in the several bearings.

In operation it is understood that the car operates as is usual in such construction. The application of pneumatic pressure to the cylinders on one side of the car will cause the associated plungers to elevate such side of the car about the axis of turn a—b on the other side and that releasing the pressure in the cylinders on the elevated side will permit the car body to be restored to its normal righted position by the action of gravity or by other conventional means for restoring the car to its normal position after it has been dumped.

In the device herein described, the plunger push acts through the yoke to distribute the strain onto the two adjacent cross bearers 22 and 23 which are located to receive this strain and to distribute it to the adjacent parts of the car body underframe. The cylinders are free to rock about their own horizontal axes and at all times the plane of the yoke contains the axis of the cylinder and push rod 16 so that there is a straight line push directly imposed on the cross bearers. As the connection provided between the cross bearers and opposite ends of the yoke is somewhat massive any tendency of the parts to become distorted as the car body is elevated has practically been eliminated.

Considering the situation on the dump side of the car as indicated at the left of Fig. 1, it is seen that the massive feet forming the depending ends of the yoke are brought into bearing with the yoke seat 19 as soon as the dumping movement is started even if the parts are not already in such bearing engagement when the car body is in its normal righted position. In this case, each cylinder and its associated yoke is maintained in its normal upright position and the car body turns about the axis a—b and about the trunnions 26 and 27 on the depressed side of the car. In this way the load of the dumped car body will be transferred through the massive trunnions and massive feet of the yoke onto the broad yoke seats forming an outbearing support from the underframe. In this way, strain originating in the longitudinally spaced apart cross bearers 22 and 23 are transferred from their respective cross bearers directly through and directly to the underframe at similarly longitudinally spaced apart points. The supports 11 and 12 are designed to have a wide connection with the underframe 10 as shown at 35 and 36 of Fig. 3 and in this way there is avoided the localizing or concentrating of strains both on the car body and on the underframe. This arrangement has the effect of avoiding or relieving twisting torque on the underframe during the dumping operation and permits the utilization of relatively small structural parts providing the pivotal connections between the car body and underframe and thus tends to lighten the car structure as a whole.

The construction features economy in space utilized to accommodate each of the dumping cylinders and its associated connection with the car body, it being particularly noted from the showing in Fig. 2 that each yoke is arched above the top of its associated cylinder and its central portion is contained within the outlines of the car body underframe. At the same time the portion of the car body underframe represented by the yoke journal bearings 24 and 25 depend a distance sufficient to bring them in close proximity to the portion of the underframe represented by the cylinder journal bearings 15. This close proximity of strain transmitting parts reduces the amount of material which must be used to form the yoke feet.

I claim:

1. In a dump car, the combination of a car body mounted for lateral tilting movement and including a pair of cross bearers, journal bearings hung from the cross bearers, a yoke provided at opposite ends with trunnions mounted in the bearings for rocking movement about a horizontal axis, a dumping cylinder having its plunger extending upwardly therefrom and engaging the yoke at its midlength whereby strains imposed on the car body by the plunger in pushing the car body into tilted position will be distributed through the two cross bearers.

2. In a dump car, the combination of a car body mounted for lateral tilting movement, a yoke pivotally connected to the car body at two longitudinally spaced apart points fixed relative to the car body, a dumping cylinder having its plunger bearing on the yoke at a point between its pivotal connections with the car body whereby the pushing force of the plunger is distributed to the car body through the two spaced apart fixed pivotal connections.

3. In a dump car, the combination of an underframe, a car body mounted thereon for tilting movement, cylinder journal bearings carried by the underframe, a dumping cylinder provided on opposite sides with trunnions mounted in the bearings, a yoke straddling the top of the cylinder and having its ends journalled in the car body, and said yoke provided at its midlength with a plunger bearing for receiving the thrust of the cylinder plunger in dumping the car body.

4. In a dump car, the combination of a car body mounted for tilting movement, a yoke including an upwardly arched underportion journalled at opposite ends in the car body for rocking movement about a horizontal axis, a dumping cylinder pivotally mounted for movement about a horizontal axis positioned below the first named axis, and having a plunger engaging the yoke at its mid-length.

5. In a dump car, the combination of a car body mounted for tilting movement, a dumping cylinder and a yoke straddling the upper portion of the cylinder when the car body is in its normal righted position, the ends of said yoke journalled in the car body and providing a pivotal connection between the car body and cylinder.

6. In a dump car, the combination of a car body mounted for tilting movement, a dumping cylinder, including a plunger, and connecting means between the plunger and car body, said means including a plurality of pivotal connections engaging the car body at a plurality of spaced apart points and including a pivotal connection with the plunger providing relative rotary movement about the axis of the plunger.

7. In a dump car, the combination of a dump body mounted for tilting movement from its normal righted position towards each of its lateral sides about an off-centered longitudinally extending axis on each side, a yoke on each side journalled for rocking movement about the axis on its associated side, a dumping cylinder on each side, each cylinder having its plunger in bearing engagement with its associated yoke and each cylinder operatively connected to act through its associated yoke to turn the car body about the axis on the opposite side of the car.

8. In a dump car, the combination of a dump body mounted for tilting movement towards a lateral side and about a longitudinal axis of turn, a yoke journalled at opposite ends for movement about said axis, and a dumping cylinder having its plunger engaging said yoke and acting therethrough to move the car into a dumped position.

9. In a dump car, the combination of an underframe, a car body mounted thereon for lateral dumping movement in both directions about longitudinal axes at opposite sides of the car, bearing members on opposite sides of the car, each journalled for rotary movement about the adjacent axis and adapted to transfer the load of the dumped car body to the part of the under frame on the dumped side of the car directly.

10. In a dump car, the combination of an underframe provided with a laterally extending outbearing support, a cylinder journal bearing carried by the support and providing a yoke seat on its upper side, a dumping cylinder rockably mounted in said bearing, a car body mounted for dumping movement about an axis of turn, a yoke journalled in the car body for rotary movement about said axis, said yoke engaging said seat to transmit strains on the dumped side of the car body to the underframe through said seat and support, and the plunger of the cylinder engaging the yoke to effect a dumping of the car body towards the opposite side of the car.

11. In a dump car, the combination of an underframe provided with an outbearing yoke seat, a car body mounted for dumping movement about an axis of turn, a yoke journalled in the car body for rocking movement about the axis of turn, and adapted to engage said seat when the car body is tilted towards the side having the seat whereby the load on the depressed side of the car body is transmitted to the underframe through the yoke bearing on said seat.

12. In a dump car, the combination of an underframe provided on opposite sides with a pair of cylinder supports, a car body mounted for lateral dumping movement in both directions and provided on opposite sides with a pair of longitudinally spaced apart journal bearings, dumping cylinders journalled in said supports and projecting upwardly into the space between the adjacent journal bearings and connecting means at each side of the car for pivotally connecting each cylinder with the adjacent side of the car body, said means extending across its associated cylinder, connected thereto and provided with trunnions mounted in the adjacent journal bearings.

13. In a dump car, the combination of an underframe provided on opposite sides thereof with cylinder supports, dumping cylinders carried by said supports and each mounted for rotary movement about a horizontal axis extending longitudinally of the car, a car body mounted for lateral dumping movement in both directions, means for pivotally connecting each of said cylinders with the adjacent side of the car body, said means each including a relatively deep flanged web forming an I-beam construction and constituting a yoke journalled in the car body for rotary movement about a horizontal axis extending longitudinally of the car and the web portion of said yoke extending in a plane containing both of said axes in all positions of the car body.

14. In a dump car, the combination of an underframe, a car body mounted thereon for lateral dumping movement in both directions, power mechanism acting between the underframe and car body for tilting the car body, said mechanism including a cylinder and a yoke pivotally connected for relative rotary movement, means providing a pivotal connection between said mechanism and the underframe and means providing a pivotal connection between said mechanism and the car body.

15. In a dump car, the combination of an underframe, a car body mounted thereon for tilting movement, mechanism for tilting the car body including a deep web yoke having a pivotal connection with the car body for relative rotary movement about a horizontal axis fixed relative to the car body, and a cylinder having a pivotal connection with the underframe for relative rotary movement about a horizontal axis and a connection between the cylinder and yoke maintaining the yoke with its web in a plane containing both of said axis in all positions of the car body.

16. In a dump car, the combination of two structural parts comprising an underframe and a car body mounted thereon for tilting movement in both lateral directions, mechanism at opposite sides of the car and acting between the underframe and car body for tilting the car body, said mechanism on each side including a yoke pivotally connected at opposite ends to one of said parts, a thrust member rockably mounted on the other part and adapted to bear on the yoke intermediate its opposite ends and means carried by the underframe providing a support for the ends of said yoke when the adjacent side of the car body is depressed.

17. In a dump car, the combination of two structural parts comprising an underframe and a car body, mechanism acting between the underframe and car body for tilting the car body, said mechanism including a thrust member pivotally mounted on one of said parts, a yoke providing a pivotal connection between the thrust member and the other part, said yoke including a flanged plate web having its greatest dimension in the direction of thrust of said thrust member.

18. In a device of the class described, the combination of an underframe, a car body mounted thereon for dumping movement, mechanism for shifting the car body relative to the underframe, said mechanism including a yoke curved at its central portion and provided at opposite ends with trunnions, the central portion including a plate web outlined with reinforcing flanges and a thrust member acting on said central portion in the direction of the plane of the web.

19. In a device of the class described, the combination of an underframe, a car body mounted thereon for dumping movement, mechanism for shifting the car body relative to the underframe, said mechanism including a yoke curved at its central portion and provided at opposite ends with trunnions, the central portion including a web outlined with reinforcing flanges and provided with a socket and a thrust member having an end mounted for rotary movement in said socket.

20. In a device of the class described, the combination of an underframe, a car body mounted thereon for dumping movement, mechanism for tilting the car body, said mechanism including a dumping cylinder pivotally mounted on the underframe for a freedom of rocking movement about an axis extending longitudinally of the car and restrained from relative movement on all other directions, said cylinder provided with a plunger, a yoke pivotally mounted on the car body for a freedom of rocking movement about an axis extending longitudinally of the car and restrained from movement in all other directions and a connection between the yoke and plunger permitting relative movement about the axis of the plunger and restraining relative movement in all other directions.

21. In a device of the class described, the combination of two structural parts comprising an underframe and a car body, mechanism acting between the underframe and car body for tilting the car body, said mechanism including a thrust member pivotally mounted on one of the parts for rocking movement, a U-shaped yoke having outstanding trunnions at its end pivotally mounted on the other part for rotary movement about an axis and said thrust member engaging the yoke intermediate its trunnion and extending at right angles across said axis.

22. In a dump car, the combination of two structural parts comprising an underframe and a car body, mechanism acting between the underframe and car body for tilting the car body, said mechanism including a thrust member carried by one of the parts, a yoke providing a pivotal connection between the thrust member and the other part, said yoke being substantially U-shaped, massive feet defining the ends of the yoke and said yoke including a plate web provided at top and bottom with flanges, the outer ends of said flanges merging integrally into the feet and means for supporting said feet.

23. In a dump car, the combination of two structural parts comprising an underframe and a car body, mechanism acting between the underframe and car body for tilting the car body, said mechanism including a thrust member carried by one of the parts, a yoke providing a pivotal connection between the thrust member and the other part, said yoke being substantially U-shaped, massive feet defining the ends of the yoke and said yoke including a plate web provided at top and bottom with flanges, the outer ends of said flanges merging integrally into the feet and trunnions extending outwardly from said feet.

24. In a dump car, the combination of an underframe, a car body mounted thereon for dumping movement, dumping mechanism pivotally supported from the underframe, a car body lifting connection between said mechanism and the car body, journalled for rocking movement in the car body and provided with a dpending foot and said underframe provided with a support adapted to receive the foot to transmit the weight of the yoke and part of the car body bearing thereon directly to the underframe.

Signed at Passaic, in the county of Passaic and State of New Jersey, this 25th day of July, A. D. 1927.

ROY E. CARTZDAFNER.